United States Patent Office 3,823,225
Patented July 9, 1974

3,823,225
REMOVAL OF AVAILABLE CHLORINE FROM ALKALI METAL CHLORATE-CHLORIDE SOLUTION AND PRODUCTION OF CHLORINE DIOXIDE FROM SAID SOLUTION
Ernest H. Sprague, Augusta, Ga., assignor to Olin Corporation
No Drawing. Filed Oct. 19, 1972, Ser. No. 298,882
Int. Cl. C01b 11/02, 11/14; C01d 3/04
U.S. Cl. 423—478
14 Claims

ABSTRACT OF THE DISCLOSURE

A method for reducing the free chlorine in aqueous solutions containing alkali metal chlorate and alkali metal chloride by the addition of a small but effective amount of a hydrazine compound. The resulting treated solution, after adjusting the molar ratio of alkali metal chlorate to alkali metal chloride, is useful as a reactant in the generation of chlorine dioxide useful as a bleaching agent in the paper industry.

---

This invention relates to improvements in the preparation of solutions used in the generation of chlorine dioxide. More particularly, it concerns an improved method for removing free chlorine from aqueous solutions of mixtures of alkali metal chlorate and alkali metal chloride.

It is known to remove free chlorine from highly acidic mediums such as concentrated hydrochloric acid by the addition of hydrazine, as disclosed in U.S. Pat. No. 2,787,525, issued April 2, 1957 to Bernard J. DeWitt. The use of hydrazine in removing free chlorine from solutions which are normally nearly neutral or slightly acidic such as mixtures of alkali metal chlorides or alkaline earth metal chlorides and alkali metal chlorates or alkaline earth metal chlorates has not been reported. Hydrazine is known to react with halogenates and hypochlorites in acid solutions as disclosed in *Hydrazine* by Charles C. Clark, Mathieson Chemical Corporation, Baltimore, Maryland, 1593, page 13.

Recent processes for the generation of chlorine dioxide have utilized solutions of an alkali metal chlorate containing a reducing agent such as sulfuric acid and an inorganic chloride which is generally an alkali metal chloride as sodium chloride or potassium chloride. For example, see U.S. Pat. No. 2,895,801, issued July 21, 1959 to W. W. Northgraves et al. When inorganic chlorides are added to solutions of alkali metal chlorates and a reducing agent, as taught in this patent, it is possible to reduce the amount of chlorate required to generate chlorine dioxide and also reduce the amount of reducing agent used, thereby resulting in a considerable reduction in the cost of materials for the generation of chlorine dioxide.

In the electrolytic production of chlorine by the mercury cell technique, a gaseous by-product containing chlorine is obtained, after first recovering the major portion of chlorine as a liquid by condensation. This gaseous by-product containing uncondensed chlorine is usually scrubbed with an aqueous base, such as an aqueous caustic solution, and the resulting liquid is disposed of as waste. This liquid contains an alkali metal chloride, an alkali metal chlorate and free chlorine. This solution is acidic because of the free chlorine and thus may be a pollution problem as well as a corrosion problem when stored or shipped in metal vessels.

It is a primary object of this invention to provide an improved method of preparing feed solutions for chlo- in chlorine dioxide generators.

It is another object of the invention to provide a method of removing free chlorine from aqueous solutions of a mixture of an alkali metal chlorate and an alkali metal chloride.

Still another object of the invention is to provide a method of removing free chlorine from an aqueous solution of a mixture of sodium chlorate and sodium chloride.

A further object of the invention is to provide an improved method of changing a waste product of electrolytic cell operations into a saleable product, useful in chlorine dioxide generators.

These and other objects of the invention will be apparent from the following detailed description of the invention.

It has now been discovered that the foregoing objects are accomplished when an aqueous solution of an alkali metal chlorate and alkali metal chloride containing excess available chlorine is reacted with sufficient hydrazine to reduce excess available chlorine. The molar ratio of alkali metal chlorate and alkali metal chloride is adjusted to the desired range and the resulting solution is then useful as a feed to chlorine dioxide generators. Chlorine dioxide is used as a bleaching agent in the production of high brightness pulps.

More in detail, any aqueous solution of a mixture of an alkali metal chlorate and an alkali metal chloride containing an excess of chlorine can be treated in accordance with the process of this invention.

Typical examples of alkali metal chlorates are sodium, potassium and lithium chlorates and mixtures thereof. Typical examples of alkali metal chlorides are sodium, potassium and lithium chlorides and mixtures thereof. In addition, alkaline earth metal chlorates such as calcium chlorate and alkaline earth metal chlorides such as calcium chloride, may also be used as components of the aqueous solutions containing free chlorine that are treated in accordance with the process of this invention. In order to simplify the disclosure of the invention, it will be desired hereinafter in terms of sodium chlorate and sodium chloride, which are the preferred components of the aqueous solution. However, those skilled in the art will recognize that any of the above-mentioned chlorates or chlorides may also be present in the aqueous solution as a substitute or partial replacement for the sodium compounds.

A typical aqueous solution of sodium chlorate and sodium chloride containing excess chlorine useful in the process of this invention is obtained by admixing an aqueous caustic solution with liquid or gaseous chlorine until the pH is below about 6. In a preferred embodiment, a suitable solution is obtained by scrubbing in aqueous caustic an uncondensed chlorine-containing gas obtained as a residue after liquifying gaseous chlorine produced by electrolyzing brine, particularly in mercury cells. This solution is obtained by first preparing an aqueous solution of sodium hydroxide containing from about 100 to about 275 grams per liter, preferably from about 150 to about 250 grams per liter. The concentration of sodium hydroxide solution used is not critical and is dependent only on the amount of sodium chlorate desired in the final product. The sodium hydroxide solution is chlorinated with a chlorine-containing gas or solution, such as a waste stream non-condensible gas from the chlorine liquefaction stage in an electrolytic chlorine production plant. The chlorination step is continued until the residual NaOH in the solution is from about 2 to about 4 grams per liter as determined by titration of the NaOH. If desired, the chlorination may be continued until the pH of the solution is below 6. In either case over chlorination is not critical but merely results in the release of chlorine from the solution. The reaction proceeds according to the equation:

$$6NaOH + 3Cl_2 \rightarrow NaClO_3 + 5NaCl + 3H_2O$$

The solution contains an excess of available chlorine which makes it highly acidic and corrosive to storage and shipping containers.

Generally the aqueous solution contains from about 40 to about 120 and preferably from about 60 to about 100 grams per liter of sodium chlorate. In addition, the aqueous solution contains from about 80 to about 325 and preferably from about 225 to about 285 grams per liter of sodium chloride. The available chlorine in the aqueous solution ranges from about 25 to about 350 and preferably from about 250 to about 300 parts per million of free available chlorine.

Excess available chlorine from the aqueous solution of sodium chlorate and sodium chloride is removed by the addition of a hydrazine compound such as hydrazine, hydrazine hydrate, hydrazine mono- or dihydrochloride, hydrazine mono- or dihydrobromide and mono- or dihydrazine sulfate. Other hydrazine derivatives may be used as long as they do not introduce impurities which will result in "puffs" or explosions when the treated solution is used as a reactant in a $ClO_2$ generator. A small but effective amount of hydrazine compound is added to the solution and is dependent on the proportion of excess available chlorine present in the solution. Generally the proportion of hydrazine compound is from about 95 to about 120 percent and preferably from about 100 to about 110 percent of the stoichiometric amount required to remove the available chlorine. Sufficient amounts of hydrazine compound are added to reduce excess available chlorine to less than about 20 and preferably less than about 5 parts per million, but insufficient to react with the sodium chlorate present in the solution.

Hydrazine compounds may be added in the solid, liquid, or gaseous form but it is preferable to add the hydrazine compound in solution form. Concentrations of hydrazine added as a solution of any convenient strength may be used. It is preferred to use aqueous solutions containing about 5 to 15 percent of hydrazine by weight. The hydrazine compound may be also added as an aqueous solution containing from about 1 to about 20 percent by weight of the hydrazine compound. The hydrazine solution is normally added at room temperature, although any convenient temperature may be used.

Blowing an inert gas such as air, $N_2$ or $CO_2$ through the sodium chlorate-sodium chloride solution may be used to reduce the amount of excess available chlorine prior to the addition of the hydrazine compound. This results in a cost savings by reducing the quantity of hydrazine compound required. The gas is introduced at ambient temperatures. It may be advantageous to continue blowing inert gas through the solution during treatment with the hydrazine compound to remove HCl formed by the reaction of $N_2H_4$ with $Cl_2$.

Following the removal of the excess available chlorine, a base, for example, sodium hydroxide or sodium carbonate is added to reduce acidity by raising the pH of the solution to the range of about 6.5 to about 8.0.

The product of the process of the present invention is an aqueous solution of alkali metal chlorate and alkali metal chloride having the concentrations defined above, and having an available chlorine content ranging from 0 to about 20, and preferably from 0 to about 5 parts per million.

These solutions may be used in chlorine dioxide generators by adding alkali metal chlorate to the solution to increase the chlorate concentration from about 0.5 to about 2.0 and preferably from about 0.8 to about 1.2 moles per liter to about 1 mol per liter of NaCl.

Chlorine dioxide is sensitive to decomposition which may be catalyzed by many oxidizable materials. The decomposition may result in "puffs" or minor explosions which are not hazardous, but do interfere with efficient operation of a $ClO_2$ generator, for example, in a bleach plant and, if they occur too frequently, may interrupt the bleaching operation.

It has been found that the solutions produced by the present invention having reduced available chlorine can be used in $ClO_2$ generators with a greatly reduced number of "puffs" or explosions.

In addition, the improved process of this invention produces a novel composition which prior to this invention was a disposal problem, but after the novel treatment of this invention, is a valuable item of commerce.

It may be desirable to add to the caustic solution, prior to scrubbing the chlorine gas, a small amount of metal salt such as cobalt sulfate or copper sulfate. These are added in amounts of about 0.5 to about 3 parts per million parts of solution by weight. Adding these salts is not necessary but during the scrubbing increases the rate of oxidation of sodium hypochlorite to sodium chlorate.

A method of producing chlorine dioxide consists of adding a solution containing a mole per mole ratio of NaCl to $NaClO_3$ to a solution of 9 molar $H_2SO_4$. This reaction gives a gaseous mixture containing 1 mole $ClO_2$ and 0.5 mole $Cl_2$.

The following example is presented to illustrate the invention more fully. All parts and percentages are by weight unless otherwise indicated.

EXAMPLE

To a 20,000 gallon tank containing 7,000 gallons of water an aqueous solution containing 50 percent NaOH by weight, was added to give a solution containing approximately 230 grams per liter of NaOH. The solution was air mixed for two hours, then analyzed for grams per liter NaOH and a correction was made by adding water to obtain the 230 gram per liter NaOH. Approximately 50 grams of cobalt sulfate was added to the tank before chlorination to increase the oxidation rate of the sodium hypochlorite initially formed to sodium chlorate. Noncondensible chlorine gas containing 15 percent $Cl_2$, 3 percent $H_2$, 2 percent $CO_2$ and 80 pecent air by volume was pumped into the tanks and chlorination continued until the residual of NaOH in the solution was less than 4 grams per liter. The solution was then aerated to reduce the available chlorine remaining in the solution to a concentration of 1 gram per liter. While continuing to aerate the solution, 6.3 gallons of an aqueous solution containing 35 percent by weight $N_2H_4$ was diluted to 10 percent $N_2H_4$ then added with continuous aeration. Following hydrazine addition, 3 gallons of 50 percent NaOH were added to raise the pH of the solution to 7.8. The product contained 97.2 grams per liter of sodium chlorate and 280.7 grams per liter of sodium chloride. Based on the chemical reaction, $$6NaOH + 3Cl_2 \rightarrow 5NaCl + NaClO_3 + 3H_2O$$

the efficiency of this system is 95 percent on both caustic usage and chemical reaction. The resulting product was admixed with sufficient sodium chlorate to bring the mole ratio of sodium chlorate to sodium chloride to about 1:1 and then used as a reactant in a chlorine dioxide generator.

What is desired to be secured by Letters Patent is:

1. The process for reducing available chlorine in an aqueous solution containing a mixture of an alkali metal chlorate, an alkali metal chloride and available chlorine, which comprises admixing said aqueous solution with an available chlorine reducing proportion of a hydrazine compound selected from the group consisting of hydrazine, hydrazine hydrate, hydrazine monohydrochloride, hydrazine dihydrochloride, monohydrazine sulfate, dihydrazine sulfate, hydrazine monohydrobromide and hydrazine dihydrobromide.

2. The process of claim 1 wherein said proportion is from about 95 to about 120 percent of the stoichiometric proportion necessary to react with said available chlorine.

3. The process of claim 2 wherein said aqueous solution prior to admixing with said proportion of hydrazine compound contains from about 40 to about 120 grams per liter of alkali metal chlorate, from about 80 to about 325 grams per liter of alkali metal chloride and from about 25 to about 350 parts per million available chlorine, and wherein after admixing with said proportion of hydrazine compound the resulting aqueous solution contains less than about 20 parts per million of available chlorine.

4. The process of claim 3 wherein said proportion is from about 100 to about 110 percent of the stoichiometric proportion necessary to react with said available chlorine.

5. The process of claim 4 wherein said hydrazine compound is added as an aqueous solution containing from about 1 to about 20 percent by weight of said hydrazine compound.

6. The process of claim 5 wherein said hydrazine compound is hydrazine.

7. The process of claim 6 wherein said alkali metal chlorate is sodium chlorate.

8. The process of claim 6 wherein said alkali metal chloride is sodium chloride.

9. The process of claim 8 wherein said alkali metal chlorate is sodium chlorate.

10. The process of claim 3 wherein said aqueous solution is prepared by scrubbing a gaseous stream containing uncondensed chlorine in an aqueous caustic solution containing between about 100 and about 275 grams per liter.

11. The process of claim 10 wherein said aqueous caustic solution is admixed with between about 0.5 and about 3 parts per million of a metal salt selected from the group consisting of cobalt sulfate and copper sulfate prior to scrubbing said gaseous stream.

12. The process of claim 10 wherein said mixture of said aqueous solution and said hydrazine compound is admixed by aeration.

13. The process of claim 9 wherein said aqueous solution after reducing available chlorine with said hydrazine is admixed with sufficient sodium chlorate to adjust the resulting sodium chlorate to sodium chloride molar ratio from about 0.8:1 to about 1.2:1.

14. The process of claim 13 wherein after adjustment of said molar ratio, the resulting solution is admixed with sulfuric acid, whereby chlorine dioxide is generated.

References Cited

UNITED STATES PATENTS

| | | | |
|---|---|---|---|
| 2,735,752 | 2/1956 | Neth | 423—407 |
| 2,787,525 | 4/1957 | De Witt | 423—488 |
| 2,936,219 | 5/1960 | Rapson | 423—478 |
| 3,056,656 | 10/1962 | Nicolaisen | 423—475 X |
| 3,341,288 | 9/1967 | Partridge et al. | 423—478 |
| 3,563,702 | 2/1971 | Partridge et al. | 423—478 |

FOREIGN PATENTS

| | | | |
|---|---|---|---|
| 328,211 | 10/1920 | Germany | 423—475 |

OTHER REFERENCES

J. W. Mellor's "A Comprehensive Treatise on Inorganic and Theoretical Chemistry," 1947, Vol. 8, pp. 313 and 314. Longmans, Green & Co., New York.

"The Chemistry of Hydrazine," Chem. & Eng. News, Vol. 26, No. 50, Dec. 131, 1948, pp. 3746–3749.

EDWARD STERN, Primary Examiner

U.S. Cl. X.R.

423—475, 499; 22—187